United States Patent Office 3,770,777
Patented Nov. 6, 1973

---

3,770,777
2-HYDROXY - 3 - (1-HYDROXYETHYL)-5-CARBOXY - 3,4 - DIHYDRO-2H-PYRAN-4-ACETIC ACID 4,5-DIMETHYL ESTER, 3-METHANESULFONATE
Robert C. Kelly, Kalamazoo, Mich., assignor to
The Upjohn Company, Kalamazoo, Mich.
No Drawing. Original application Aug. 24, 1970, Ser. No. 66,557, now Patent No. 3,703,530, dated Nov. 21, 1972. Divided and this application Apr. 12, 1972, Ser. No. 243,488
Int. Cl. C07d 7/14
U.S. Cl. 260—345.8                    1 Claim

ABSTRACT OF THE DISCLOSURE

A total synthesis of elenolic acid, Formula XIV (R and $R_2$ are hydrogen, $R_1$ and $R_3$ are methyl) and the analogs thereof, of Formula XIV:

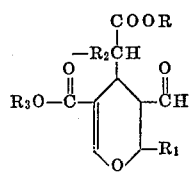

XIV wherein R and $R_3$ are alkyl of 1 to 8 carbon atoms, inclusive, wherein $R_1$ is alkyl of 1 to 4 carbon atoms, inclusive, and wherein $R_2$ is selected from the group consisting of hydrogen and alkyl of 1 to 4 carbon atoms, inclusive, is carried out by a multi-step process starting from cyclopentadiene. Compounds of Formula XIV have virucidal and hypotensive activity and can be used as hypotensive agents in mammals (U.S. Pat. 3,033,877) or as virucidal agents to decontaminate surgical instruments, hospital walls, swimming pools, or can be used for nasal washes in mammals.

---

This is a division, of application Ser. No. 66,557, filed Aug. 24, 1970, and now U.S. Pat. No. 3,703,530, issued Nov. 21, 1972.

BACKGROUND OF THE INVENTION

(1) Field of the invention

The present invention is concerned with a process for the synthesis of elenolic acid, analogs and derivatives thereof and with the intermediates in said process.

(2) Description of the prior art

Already in 1931 A. D. Burnett and M. Oliviero [Bull. Acc. Med. 122, 191 (1931)] recognized that an extract from the leaves of the olive tree (*Olea europaea*) contained a hypotensive principle [see also L. Panizzi et al., Gazz. Chim. Ital. 90, 1449 (1960)].

W. L. Constantijn Veer, U.S. Pat. 3,033,877, issued May 8, 1962, described the preparation of elenolic acid, salts, "ether-esters" and other analogs of elenolic acid. The only method for the preparation of this acid, salts or derivatives thereof was by extraction and chemical treatment of the extractives of the leaves or the fruit of *Olea europaea*. In particular the aqueous press juice resulting from pressing the ripe fruit was used. The amount of acid obtained was always exceedingly small; e.g., U.S. Pat. 3,033,877 reports that from 250 kg. of leaves of *Olea europaea* 114 g. of an impure oil was obtained concerning which it was stated "consists for the greater part of elenolic acid." The same patent reports that from 160 liters of press juice 0.35 g. of elenolide (lactone form of elenolic acid) was obtained.

The Upjohn Company from a batch of 37,000 liters of olive press juice (obtained in Spain) isolated 1,300 g. of highly purified calcium elenolate, much purer than the material reported above. In addition, on the basis of nuclear magnetic resonance, ultraviolet and infrared data, it was indicated that the older structures are not correct, and that the most likely structure of elenolic acid is:

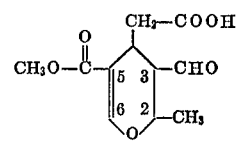

The present total synthesis of elenolic acid and its analogs is therefore a significant advance over the preparation from the natural materials obtainable from the European olive tree.

SUMMARY OF THE INVENTION

The novel process of this invention and the novel intermediates therein can be illustratively represented by the following sequence of formulae:

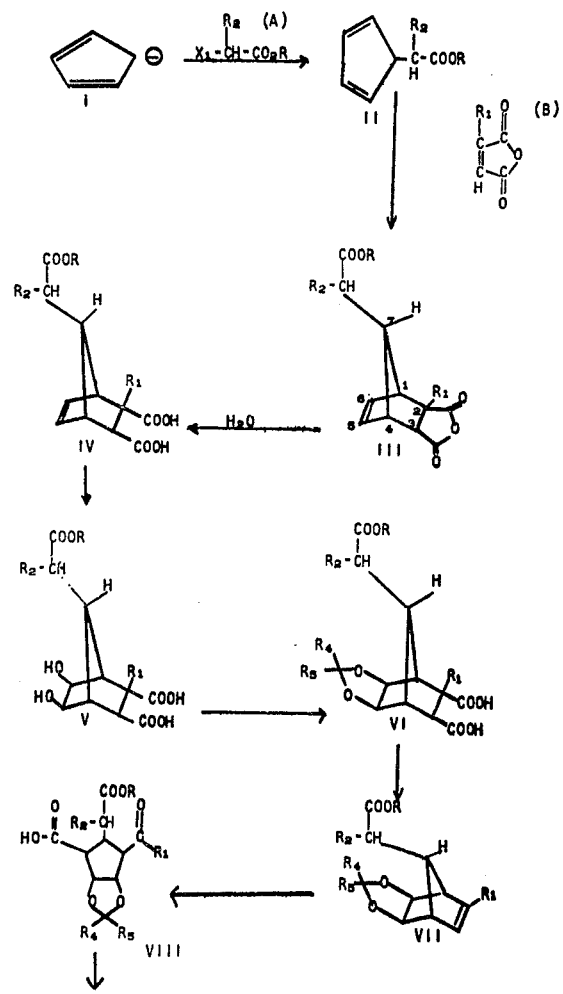

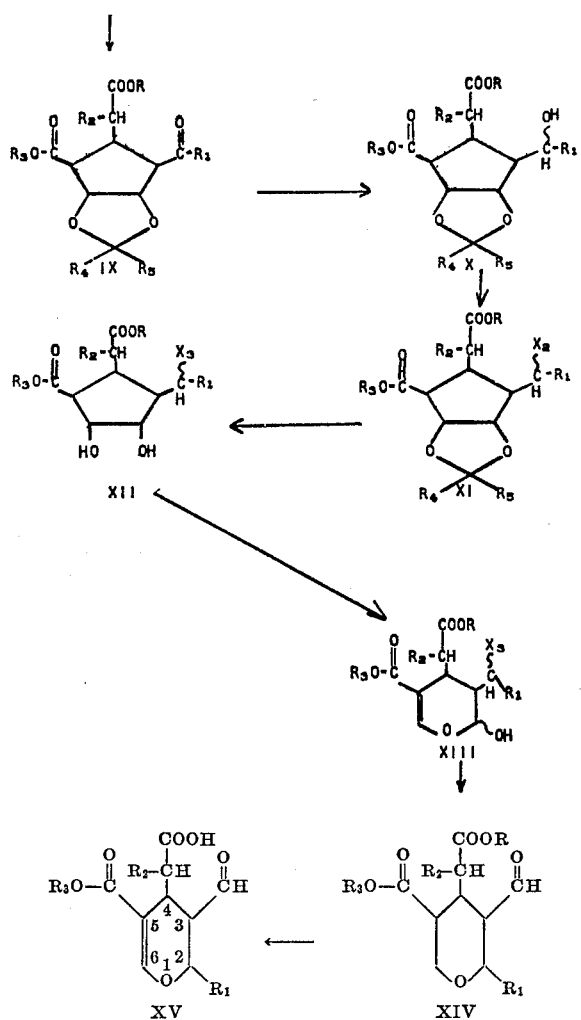

wherein R and $R_3$ are alkyl of 1 to 8 carbon atoms, inclusive, wherein $R_1$ is alkyl of 1 to 4 carbon atoms, inclusive, wherein $R_2$ is selected from the group consisting of hydrogen and alkyl of 1 to 4 carbon atoms, inclusive, wherein $R_4$ and $R_5$ are selected from the group consisting of hydrogen, alkyl of 1 to 4 carbon atoms, inclusive, and phenyl, with the proviso that only one of $R_4$ and $R_5$ is phenyl, wherein $X_1$ is selected from the group consisting of bromine, iodine, benzenesulfonyloxy, alkanesulfonyloxy and alkylbenzenesulfonyloxy in which each alkyl moiety is of 1 to 4 carbon atoms, inclusive, and wherein $X_2$ is the anion of acid $HX_2$ which can be easily removed as $HX_2$ to form a temporary double bond, and wherein $X_3$ is selected from the group consisting of those radicals represented by $X_2$ and hydroxy.

The process of this invention comprises: reacting cyclopentadienyl lithium, sodium, or potassium (I) with an alkylating agent of the formula

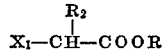

(A) wherein R, $R_2$, and $X_1$ are as given above, to give the corresponding 1,3-cyclopentadiene-5-acetic acid alkyl ester (II); reacting II at low temperatures with an alkylmaleic anhydride (B) to obtain the corresponding 2,3-dicarboxy-5-norbornene-7-acetic acid alkyl ester 2,3-anhydride (III); hydrolyzing III to obtain the corresponding 2,3-dicarboxy-5-norbornene-7-acetic acid alkyl ester (IV); treating IV with osmium tetroxide, or with a chlorate salt and a catalytic amount of osmium tetroxide, to obtain the corresponding 2,3-dicarboxy-5,6-dihydroxynor- bornane-7-acetic acid alkyl ester (V); treating V with an aldehyde or ketone, preferably acetone, to obtain the corresponding 2,3-dicarboxy-5,6-dihydroxynorbornane-7-acetic acid, alkyl ester, acetal or ketal (VI); subjecting VI to electrolysis in a water-pyridine solution containing 1 to 5% of a tertiary amine such as triethylamine to obtain the corresponding 5,6-dihydroxy-2-norbornene-7-acetic acid, alkyl ester, acetal or ketal (VII); oxidizing VII with aqueous potassium permanganate and sodium periodate to give the corresponding 2-alkanoyl-3,4-dihydroxy - 5 - carboxycyclopentaneacetic acid, alkyl ester, acetal or ketal (VIII); esterifying (VIII) with an alkanol in the presence of a dehydrating agent such as a carbodiimide or with diazoalkane to obtain the corresponding 2-alkanoyl - 3,4 - dihydroxy-5-carboxycyclopentaneacetic acid, 1,5-dialkyl ester, acetal or ketal (IX) (the two alkyl groups 1 and 5 can be alike or different); reducing IX with an alkali metal borohydride to give the corresponding 2 - (1-hydroxyalkyl)-3,4-dihydroxy-5-carboxycyclopentaneacetic acid, 1,5-dialkyl ester, acetal or ketal (X); converting X to a 2-ester, e.g., the methanesulfonate of 2 - (1 - hydroxyalkyl)-3,4-dihydroxy-5-carboxycyclopentaneacetic acid 1,5-dialkyl ester, acetal or ketal (XI); treating XI with a dilute aqueous acid to give 2-(1-hydroxyalkyl) - 3,4 - dihydroxy - 5 - carboxycyclopentaneacetic acid, 1,5-dialkyl ester, 2-ester, e.g., 2-methanesulfonate (XII); oxidizing the glycol XII with aqueous periodate salt to give the corresponding 2-hydroxy-3-(1-hydroxyalkyl) - 5 - carboxy - 3,4 - dihydro-2H-pyran-4-acetic acid, 4,5-dialkyl ester, 3-ester (XIII); heating Compound XIII in a basic medium, pH 7.5 to 9, to give the corresponding Compound (XIV), e.g., methyl elenolate when R, $R_1$, and $R_3$ are methyl and $R_2$ is hydrogen. Compound XIV can be selectively hydrolyzed with dilute mineral acid to an acid of Formula XV. If in Formula XV $R_1$ and $R_3$ are methyl and $R_2$ is hydrogen, the acid is elenolic acid.

Alternatively, Compound X can be hydrolyzed with dilute aqueous acid to give Compound XII where $X_3$ is hydroxy.

DESCRIPTION OF THE PREFERRED EMBODIMENTS

The alkyl groups herein used having from 1 to 4 carbon atoms, inclusive, such as $R_1$ and $R_2$ are illustratively methyl, ethyl, propyl, butyl, isobutyl, secondary butyl and the like.

The alkyl groups herein used having from 1 to 8 carbon atoms, inclusive, comprise the group of alkyl groups above with up to 4 carbon atoms, and pentyl, hexyl, heptyl, and octyl and the branched isomers thereof.

The parameter $X_1$ herein used is a negative element or group which is reactive in metathetic reactions with compounds containing a strong positive element such as sodium, potassium or lithium. Such negative elements or groups are illustratively iodine, bromine, methanesulfonyloxy, butanesulfonyloxy, benzenesulfonyloxy, p-toluenesulfonyloxy and the like.

The parameter $X_2$ is a negative element or negative group which includes all groups and elements disclosed for $X_1$, and also chlorine, and $-OCOR_6$ in which $R_6$ is selected from the group consisting of alkyl of 1 to 8 carbon atoms, inclusive, as illustrated above, and phenyl and p-tolyl.

Elenolic acid being of low stability is generally used only in the form of salts, such as the calcium salt, sodium salt or as an ester, e.g., as methyl or ethyl elenolate. Such products were known to be hypotensive and were known to be useful in human and animals as hypotensive agents (see U.S. Patent 3,033,877.) More recently it was discovered that calcium elenolate and other metal elenolates and esters of elenolic acid are highly virucidal against Coxsackie A–21 virus, polioviruses 1, 2, and 3, rhinovirus strain 209, parainfluenza–3 virus, herpes viruses, vaccinia virus, adenoviruses 1, 2, 3, and 7, respiratory syncitial virus, Newcastle disease virus and others. Saline solution of 1 mg. per ml. of calcium elenolate reduced the viral activity (measured by the number of plaques of viruses present in the sample) as follows:

| Virus | Untreated control | Treated |
|---|---|---|
| Newcastle Disease | $4.1 \times 10^5$ $2.1 \times 10^6$ | $1.4 \times 10^2$ $8.5 \times 10^1$ |
| Polio: | | |
| 1 | $3.0 \times 10^7$ $2.8 \times 10^7$ | $8.6 \times 10^4$ $1.2 \times 10^5$ |
| 2 | $4.1 \times 10^5$ $3.1 \times 10^5$ | $2.1 \times 10^3$ $3.6 \times 10^3$ |
| 3 | $3.7 \times 10^4$ $4.0 \times 10^4$ | $5.7 \times 10^3$ $5.7 \times 10^3$ |
| Influenza A (PR-8) | $9.1 \times 10^5$ $6.0 \times 10^5$ | $<10^1$ $<10^1$ |
| Parainfluenza-3 | $7.4 \times 10^5$ | $<10$ |

Likewise, the compounds of Formulas XIII, XIV, and XV and salts thereof are virucidal and are thus useful to cleanse glassware, apparatus, and hospital equipment from virus contamination when used in solutions of 0.1 to 5 parts per 1000 (weight) in the cleaning solution.

In carrying out the process of this invention a cyclopentadiene alkali metal salt, e.g., cyclopentadienyl lithium, sodium, or potassium (I) is reacted with a negatively substituted alkyl acetate (A) as defined above, e.g., methyl bromo-, iodo-, or methanesulfonyloxyacetate, ethyl 2-bromopropionate, and the like. The reaction is preferably carried out by adding to the cyclopentadiene alkali metal salt, in purified tetrahydrofuran, the substituted alkali acetate, dropwise, in a nitrogen atmosphere, at a temperature of −10 to −30° C. However, temperatures between 0° and −50° C. are operative. Instead of tetrahydrofuran, diethyl, dipropyl, dibutyl ether, or mixed ethers can be used. An average of 70 to 80% yield of 1,3-cyclopentadiene-5-acetic acid alkyl ester (II) is obtained, which is used in crude form in the next step.

Compound II in its crude form in tetrahydrofuran or an ether as stated above is reacted with an approximately equimolar amount of alkylmaleic anhydride at a low temperature, between +5 and −30° C. The reaction period is between 12 hours and 21 days. The thus-obtained product is isolated by conventional procedure, e.g., evaporating the solvent, extraction, crystallization and combinations thereof and is purified by standard methods such as crystallization, chromatography and the like to provide the corresponding 2,3 - dicarboxy-5-norbornene-7-acetic acid alkyl ester 2,3-anhydride (III).

Compound III is hydrolyzed in conventional manner, such as by heating the compound in aqueous 5% sodium or potassium bicarbonate solution between 10 to 60 minutes on the steam bath, and thereafter acidifying the resulting solution to a pH of 3. The product, a 2,3-dicarboxy-5-norbornene-7-acetic acid alkyl ester (IV) precipitates in the aqueous solution and can be easily collected on a filter. Purification of the product is best achieved by crystallizing the precipitated product.

Compound IV is tested with an alkali metal or alkaline earth chlorate salt (e.g., sodium, potassium, calcium or barium chlorate) and a catalytic quantity of osmium tetroxide. The reaction can be run in partial suspension through the use of water as reaction medium or in solution through the use of mixed solvents such as water-tert. butyl alcohol or water-tetrahydrofuran, and the like. In the preferred embodiment of this invention Compound IV is treated in a water suspension with a 0.1 to 0.5 molar excess of chlorate salt and 0.2 to 1% by weight of osmium tetroxide. The temperature for the reaction is preferably 40–50° C., but temperatures between 10 and 75° C. are operative. The reaction time is between 2 and 100 hours and is in general between 5 and 20 hours.

Compound IV can also be oxidized with osmium tetroxide alone, as illustrated in Example 8. The product of the foregoing oxidation, a 2,3-dicarboxy-5,6-dihydroxynorbornane-7-acetic acid alkyl ester (V) is generally isolated by extraction and the product purified by crystallization.

Compound V is treated with a large excess of an aldehyde or ketone, e.g., acetaldehyde, benzaldehyde, acetone, diethyl ketone, ethyl methyl ketone, dipropyl ketone, acetophenone, or the like in the presence of an anhydrous acid, e.g., hydrogen chloride or hydrogen bromide. In the preferred embodiment of this invention, Compound V is treated with a large excess of acetone, which acts as reagent and slurrying agent, in the presence of 5 to 15% of 2,2-dimethoxypropane and 0.1 to 1% of anhydrous hydrogen chloride. The reaction can be carried out at temperatures between 10 to 40° C. during a period of 15 to 120 minutes. The product, a 2,3-dicarboxy-5,6-dihydroxynorbornane-7-acetic acid, alkyl ester, acetal or ketal (VI) is isolated and purified by conventional procedures, e.g., extraction, crystallization, chromatography and the like.

Compound VI is electrolyzed in a basic medium, e.g., in pyridine-water mixtures with 1–5% (by volume) of trialkylamine present, e.g., triethylamine or tributylamine, or heterocyclic tertiary amines such as 1-methylpiperidine, 4-methylmorpholine, and 1,4-diaza[2.2.2]bicyclooctane. The electrodes are preferably platinum and the voltage is held between 50 and 100 volts. The reaction mixture is kept to 20° C. or less during the electrolysis. The electrolysis is advantageously carried out by starting the electrolysis with approximately 20% of the solution to be electrolyzed and then adding the remaining portion slowly so as to maintain the amperage at approximately 4 for a voltage of 80 and a temperature of 20° C. The total reaction time is between 4 to 6 hours. The thus-produced 5,6-dihydroxy-2-norbornene-7-acetic acid, alkyl ester, acetal or ketal (VII) is isolated and purified, preferably by chromatography, recrystallization, extraction, and the like.

Compound VII is oxidized within a pH range 6.0 to 8.5, with an aqueous solution of permanganate and periodate salts, preferably sodium or potassium permanganate and sodium or potassium periodate, with sodium or potassium bicarbonate present. The oxidizing reagents are used in excess of the required stoichiometric amounts in aqueous concentration of 0.5 to 10% (weight) of oxidant to water. The reaction is carried out at temperatures between 10 and 50° C. during a period of 1 to 8 hours, preferably with stirring. To avoid losses by additional undesired oxidation reactions, the reaction when near completion is terminated by adding sodium sulfite until the permanganate color disappears. The product is preferably isolated by extraction with an organic water-immiscible solvent, e.g., chloroform, methylene chloride, benzene or the like. The thus-obtained 2-alkanoyl-3,4-dihydroxy-5-carboxycyclopentaneacetic acid, alkyl ester, acetal or ketal (VIII) can be purified by recrystallization.

The acid compound VIII is esterified by conventional procedures, e.g., with an alkanol and a dehydrating agent such as a carbodiimide, e.g., dicyclohexylcarbodiimide, a sulfonyl chloride, e.g., p-toluenesulfonyl chloride, a chloroformate, e.g., isobutyl chloroformate, and the like, or with a diazoalkane in ether to give a dialkyl ester, 2-alkanoyl-3,4-dihydroxy-5-carboxycyclopentaneacetic acid, 1,5-dialkyl ester, acetal or ketal (IX).

Compound IX is then selectively reduced with a metal hydride, preferably a metal borohydride such as lithium, sodium, or potassium borohydride. In the preferred embodiment of this invention, the borohydride is added in portions over a short period, 10–30 minutes, to a solution of the diester IX in solution. Methanol, ethanol or ether are the preferred solvents for Compound IX. The thus-obtained Compound X, a 2 - (1-hydroxyalkyl)-3,4-dihydroxy-5-carboxycyclopentaneacetic acid, 1,5-dialkyl ester, acetal or ketal, is isolated and purified by conventional procedures, e.g., extraction, chromatography, crystallization, and the like.

The hydroxy group of Compound X is then esterified, preferably with methanesulfonyl chloride in pyridine solution at a low temperature, for example, between +10 and −15° C. Other alkane-, alkylbenzene- and benzenesulfonyl halides can be used, as well as alkanoyl, benzoyl, and p-toluoyl halides and anhydrides, or brominating and chlorinating agents, e.g., N-bromosuccinimide, N-bromoacetamide, thionyl chloride and the like. Extraction and recrystallization provide the corresponding 2-(1-hydroxyalkyl-3,4-dihydroxy-5-carboxycyclopentaneacetic acid, 1,5-dialkyl ester, 2-methanesulfonate, acetal or ketal (XI) or other Formula XI 2-ester.

Compound XI is converted to the corresponding 2-(1-hydroxyalkyl) - 3,4-dihydroxy-5-carboxycyclopentaneacetic acid, 1,5-dialkyl ester, 2-ester, e.g., 2-methanesulfonate (XII) by treating it for 1 to 4 hours in aqueous formic acid or in aqueous sulfuric acid, hydrochloric acid or other dilute mineral acids, at a temperature between 10 and 50° C., preferably at room temperature between 22 and 26° C. The product XII is recovered by evaporating the reaction mixture, freeze-drying or chromatography.

Compound XII is then treated with excess aqueous alkali metal periodate salt, e.g., sodium or potassium periodate at a pH between 5 and 7 and at a temperature between 15 and 40° C. for 1 to 8 hours, usually from 2 to 4 hours at room temperature and the reaction mixture is extracted with a water-immiscible solvent. The extract contains in solution the corresponding 2-hydroxy-3-(1-hydroxyalkyl) - 5-carboxy - 3,4-dihydro-2H-pyran-4-acetic acid, 4,5-dialkyl ester, 3-ester, e.g., 3-methanesulfonate (XIII). Compound XIII can be obtained by distillation of the solvent and purified by conventional procedures, e.g., crystallization, chromatography, and the like.

Heating a mildly basic solution (preferably aqueous pyridine) containing Compound XIII at 90–100° C. for a period of 10 to 300 minutes gives a 3-formyl-5-carboxy-34-dihydro-2H-pyran-4-acetic acid 4,5-dialkyl ester (XIV). In the case that R, $R_1$, and $R_3$ are methyl and $R_2$ is hydrogen the product XIV is methyl elenolate. Compound XIV is isolated by conventional procedures such as extraction, differential distribution of the product XIV in a solvent system, e.g., Craig extractor or chromatography.

Heating Compound XIV with dilute mineral acid, e.g., 0.1 M sulfuric acid gives 3-formyl-5-carbalkoxy-3,4-dihydro-2H-pyran-4-acetic acid (XV), which in case $R_1$ and $R_3$ are methyl and $R_2$ is hydrogen is free elenolic acid.

The following preparation and examples illustrate this invention.

PREPARATION 1

Cyclopentadienyl sodium

Metallic sodium (23 g.; 1 mole) was pressed into a fine ribbon and suspended in freshly purified tetrahydrofuran. A 100 ml. quantity of cyclopentadiene was added in one portion and the mixture was stirred under nitrogen for 45 minutes. During that period a vigorous reaction occurred, warming the mixture to reflux. After this time an outside heat source was applied and the reaction mixture was heated under reflux an additional 2 hours. By this time all of the sodium had reacted. The cyclopentadienyl sodium is extremely sensitive to air and depending on the care with which the reaction was run, at this point it showed variation from near colorless through pink to deep purple. The color did not seem to appreciably affect the yields.

In the same manner given above cyclopentadienyl lithium or potassium can be made.

EXAMPLE 1

Methyl 1,3-cyclopentadiene-5-acetate

One mole of cyclopentadienyl sodium, made up with tetrahydrofuran to 1 liter was cautiously transferred, under a nitrogen atmosphere, to a dropping funnel and was then added dropwise over 1.5 hours to 304 g. (2.0 moles) of methyl bromoacetate cooled to −20° C. During the addition, the reaction mixture was maintained between −20 and −15° C. The crude reaction mixture was used as such for the subsequent step. The product was analyzed by withdrawing an aliquot, filtering and distilling the tetrahydrofuran from the aliquot filtrate at >−10° C. under high vacuum. The residue was quickly dissolved in deuterochloroform and an NMR taken. Analyses of various runs of the reaction have indicated 70–80% of the desired isomer (methyl 1,3-cyclopentadiene-5-acetate) and 30–20% of the 1-isomer (methyl 1,3-cyclopentadiene-1-acetate).

NMR spectrum (CDCl$_3$, δ)

(a) 5-isomer=2.38 (2H, d., J=8.5 cps.), 3.67 (3H, s.), 6.42 (4H, s.)
(b) 1-isomer=3.00 (2H, m.), 3.44 (2H, m.), 3.65 (3H, s.), 6.38 (3H, m.)

The same product is obtained by replacing the cyclopentadienyl sodium with cyclopentadienyl lithium or potassium.

EXAMPLE 2

Ethyl α-methyl-1,3-cyclopentadiene-5-acetate

In the manner given in Example 1, cyclopentadienyl sodium was added to ethyl α-bromopropionate to give ethyl α-methyl-1,3-cyclopentadiene-5-acetate.

In the same manner given in Example 1, other alkyl 1,3-cyclopentadiene-5-acetates and alkyl α-alkyl-1,3-cyclopentadiene-5-acetates (II) can be made by reacting an alkyl α-bromoalkanoate (A) with cyclopentadienyl anion. Representative compounds, thus obtained, include:

propyl α-ethyl-1,3-cyclopentadiene-5-acetate,
butyl α-propyl-1,3-cyclopentadiene-5-acetate,
pentyl α-butyl-1,3-cyclopentadiene-5-acetate,
hexyl α-methyl-1,3-cyclopentadiene-5-acetate,
heptyl 1,3-cyclopentadiene-5-acetate,
octyl 1,3-cyclopentadiene-5-acetate,
isopropyl α-methyl-1,3-cyclopentadiene-5-acetate,
isobutyl α-propyl-1,3-cyclopentadiene-5-acetate,
and the like.

EXAMPLE 3

Methyl 2,3-dicarboxy-2-methyl-5-norbornene-7-acetate 2,3-anhydride

The total crude reaction mixture containing methyl 1,3-cyclopentadiene-5-acetate (Example 1) from a 1.5-mole run was treated with 500 g. (4.4 moles) of citraconic anhydride. After distillation of excess solvent at less than −10° C. and less than 1 mm., the reaction mixture was allowed to stand 14 days at −13° C. The reaction mixture was then partitioned between methylene chloride and water. The methylene chloride solution was thoroughly washed successively with 5% aqueous sodium bicarbonate solution, water, and saturated brine. The methylene chloride solution was then dried over anhydrous sodium sulfate and distilled in vacuo, leaving a viscous brown residue. Crystallization of the residue from ether gave 147.5 g. of methyl 2,3-dicarboxy-2-methyl-5-norbornene-7-acetate 2,3-anhydride of melting point 100–103° C. There was obtained from the mother liquors a second crop amounting to 24.3 g.; melting point 90–105° C.

A sample was prepared for analysis by one more crystallization from methylene chloride-ether; melting point 105–108° C.

Analysis.—Calcd. for $C_{13}H_{14}O_5$ (percent): C, 62.39; H, 5.64. Found (percent): C, 62.28; H, 5.97.

NMR spectrum (CDCl₃, δ): 1.66 (3H, s.), 2.41 (2H, A₂B), 2.6 (1H, A₂B), 3.0 (1H, m.), 3.2 (1H, d., J=4 cps.), 3.6 (1H, m.), 3.65 (3H, s.), 6.30 (2H, AA'XX')

EXAMPLE 4

Ethyl 2,3-dicarboxy-2-methyl-5-norbornene-7-acetate 2,3-anhydride

In the manner given in Example 3, ethyl 1,3-cyclopentadiene-5-acetate was reacted with citraconic anhydride to give ethyl 2,3-dicarboxy-2-methyl-5-norbornene-7-acetate 2,3-anhydride.

In the manner given in Examples 3 and 4, other alkyl 2,3-dicarboxy-2-alkyl and alkyl α-alkyl-2,3-dicarboxy-2-alkyl-5-norbornene-7-acetate 2,3-anhydrides can be produced by reacting a selected alkyl 1,3-cyclopentadiene-5-acetate or alkyl α-alkyl-1,3-cyclopentadiene-5-acetate with an alkylmaleic anhydride. Representative compounds, thus produced, include:

ethyl α-methyl-2,3-dicarboxy-2-methyl-5-norbornene-7-acetate 2,3-anhydride,
propyl α-ethyl-2,3-dicarboxy-2-propyl-5-norbornene-7-acetate 2,3-anhydride,
butyl α-propyl-2,3-dicarboxy-2-butyl-5-norbornene-7-acetate 2,3-anhydride,
isopropyl α-butyl-2,3-dicarboxy-2-isobutyl-5-norbornene-7-acetate 2,3-anhydride,
isobutyl α-isobutyl-2,3-dicarboxy-2-isopropyl-5-norbornene-7-acetate 2,3-anhydride,
hexyl α-propyl-2,3-dicarboxy-2-methyl-5-norbornene-7-acetate 2,3-anhydride,
heptyl α-isopropyl-2,3-dicarboxy-2-methyl-5-norbornene-7-acetate 2,3-anhydride,
octyl α-methyl-2,3-dicarboxy-2-methyl-5-norbornene-7-acetate 2,3-anhydride,
pentyl 2,3-dicarboxy-2-ethyl-5-norbornene-7-acetate 2,3-anhydride,
isopentyl 2,3-dicarboxy-2-methyl-5-norbornene-7-acetate 2,3-anhydride,
methyl α-methyl-2,3-dicarboxy-2-methyl-5-norbornene-7-acetate 2,3-anhydride,
ethyl α-ethyl-2,3-dicarboxy-2-butyl-5-norbornene-7-acetate 2,3-anhydride, and the like.

EXAMPLE 5

Methyl 2,3-dicarboxy-2-methyl-5-norbornene-7-acetate

A 225 g. quantity of methyl 2,3-dicarboxy-2-methyl-5-norbornene-7-acetaate 2,3-anhydride was added to 2 l. of water. After stirring for 1 hour at reflux, the reaction mixture was filtered while still hot. On standing and cooling, 192 g. of crystals were deposited; melting point 146–148° C. A second crop of 14 g. was obtained; melting point 138–141° C.

A sample was prepared for analysis by one more crystallization from water; melting point 151–152° C.

Analysis.—Calcd. for C₁₃H₁₆O₆ (percent): C, 58.20; H, 6.01. Found (percent): C, 58.16; H, 6.10.

EXAMPLE 6

Ethyl 2,3-dicarboxy-2-methyl-5-norbornene-7-acetate

In the manner given in Example 5, ethyl 2,3-dicarboxy-2-methyl-5-norbornene-7-acetate 2,3 - anhydride was hydrolyzed in water to give ethyl 2,3-dicarboxy-2-methyl-5-norbornene-7-acetate.

In the manner given in Example 5, other alkyl 2,3-dicarboxy-5-norbornene-7-acetate 2,3-anhydrides of Formula III, as listed above, can be hydrolyzed in water to give the corresponding alkyl 2,3-dicarboxy-5-norbornene-7-acetates. Products thus obtained, include:

ethyl α-methyl-2,3-dicarboxy-2-methyl-5-norbornene-7-acetate,
propyl α-ethyl-2,3-dicarboxy-2-propyl-5-norbornene-7-acetate,
butyl α-propyl-2,3-dicarboxy-2-butyl-5-norbornene-7-acetate,
isopropyl α-butyl-2,3-dicarboxy-2-isobutyl-5-norbornene-7-acetate,
isobutyl α-isobutyl-2,3-dicarboxy-2-isopropyl-5-norbornene-7-acetate,
hexyl α-propyl-2,3-dicarboxy-2-methyl-5-norbornene-7-acetate,
heptyl α-isopropyl-2,3-dicarboxy-2-methyl-5-norbornene-7-acetate,
octyl α-methyl-2,3-dicarboxy-2-methyl-5-norbornene-7-acetate,
pentyl 2,3-dicarboxy-2-ethyl-5-norbornene-7-acetate,
pentyl 2,3-dicarboxy-2-methyl-5-norbornene-7-acetate,
methyl α-methyl-2,3-dicarboxy-2-methyl-5-norbornene-7-acetate,
ethyl α-ethyl-2,3-dicarboxy-2-butyl-5-norbornene-7-acetate, and the like.

EXAMPLE 7

Methyl 2,3-dicarboxy-2-methyl-5-norbornene-7-acetate

In the manner given in Example 4, 1 mole of methyl 1,3-cyclopentadiene-5-acetate was reacted with 340 g. of citraconic anhydride in tetrahydrofuran.

The tetrahydrofuran was removed by distillation in vacuo at > —10° C. The reaction mixture was allowed to stand for 3 days at —13° C. and 2 days at —2° C. The mixture was then poured into 1 liter of water containing 320 g. of sodium carbonate. The resultant mixture was cautiously heated on a steam bath for 1 hour. It was then cooled, extracted with methylene chloride and then acidified with concentrated hydrochloric acid. The precipitated product was collected by filtration and washed with water. Crystallization of the product from water gave 38.0 g. of methyl 2,3-dicarboxy-2-methyl-5-norbornene-7-acetate of melting point 150–151° C. Second and third crops totaling 16.1 g. were obtained; melting point 139–143° C.

EXAMPLE 8

Methyl 2,3-dicarboxy-5,6-dihydroxy-2-methyl-norbornane-7-acetate

A 106 g. (0.396 mole) quantity of methyl 2,3-dicarboxy-2-methyl-5-norbornene-7-acetate was dissolved in 750 ml. of tetrahydrofuran and the resultant solution was treated with 100 g. (0.394 mole) of osmium tetroxide in 750 ml. of tetrahydrofuran. The mixture was allowed to stand for three days at 25° C. The resultant black mixture was cooled in an ice bath, stirred and treated with excess hydrogen sulfide gas. The mixture was filtered free of solids. The filter cake was washed thoroughly with tetrahydrofuran. The filtrate and the washes were combined and evaporated to dryness. Crystallization of the residue from ethyl acetate gave 63.8 g. of methyl 2,3-dicarboxy-5,6 - dihydroxy-2-methylnorbornene-7-acetate as off-white crystals of melting point 121–127° C. There was obtained from the mother liquors a second crop amounting to 7.0 g. of product. Total yield 59%. A sample was prepared for analysis by recrystallization from water; melting point 122–126° C.

Analysis.—Calcd. for C₁₃H₁₈O₈ (percent): C, 48.75; H, 6.29. Found (percent): C, 48.79; H, 6.42.

EXAMPLE 9

Methyl 2,3-dicarboxy-5,6-dihydroxy-2-methyl-norbornane-7-acetate

A 5.0 g. (19 millimoles) quantity of methyl 2,3-dicarboxy-2-methyl-5-norbornene-7-acetate was added to a solution of 3.0 g. (24.5 millimoles) of potassium chlorate and 50 mg. of osmium tetroxide in 125 ml. of water. The mixture was warmed to 50° C. and stirred for 5 hours. The reaction mixture was then cooled and extracted with benzene. The aqueous layer was saturated with sodium chloride and extracted 3 times with tetrahydrofuran. The tetrahydrofuran solution was dried over anhydrous magnesium sulfate and distilled in vacuo, leaving an oil. Crystallization of the oil from ethyl acetate gave 1.95 g. of methyl 2,3 - dicarboxy-5,6-dihydroxy-2-methylnorbornane-7-acetate; melting point 129–130° C.

EXAMPLE 10

Ethyl 2,3-dicarboxy-5,6-dihydroxy-2-ethyl-norbornane-7-acetate

In the manner given in Example 9, ethyl 2,3-dicarboxy-2-ethyl-5-norbornene-7-acetate was treated wtih osmium tetroxide in tetrahydrofuran to give ethyl 2,3-dicarboxy-5,6-dihydroxy-2-ethylnorbornane-7-acetate.

In the manner given in Example 9, other alkyl 2,3-dicarboxy-5,6-dihydroxy-2-alkylnorbornane - 7 - acetates are produced by treating the corresponding alkyl 2,3-dicarboxy-2-alkyl-5-norbornene-7-acetates with osmium tetroxide. Representative compounds, thus prepared, include:

ethyl 2,3-dicarboxy-5,6-dihydroxy-2-methylnorbornane-7-acetate,
propyl 2,3-dicarboxy-5,6-dihydroxy-2-propylnorbornane-7-acetate,
butyl 2,3-dicarboxy-5,6-dihydroxy-2-butylnorbornane-7-acetate,
isopropyl α-butyl-2,3-dicarboxy-5,6-dihydroxy-2-isobutylnorbornane-7-acetate,
isobutyl 2,3-dicarboxy-5,6-dihydroxy-2-isopropyl-norbornane-7-acetate,
hexyl α-propyl-2,3-dicarboxy-5,6-dihydroxy-2-methyl-norbornane-7-acetate,
heptyl 2,3-dicarboxy-5,6-dihydroxy-2-ethylnorbornane-7-acetate,
octyl α-methyl-2,3-dicarboxy-5,6-dihydroxy-2-propyl-norbornane-7-acetate,
pentyl 2,3-dicarboxy-5,6-dihydroxy-2-ethylnorbornane-7-acetate,
isopentyl 2,3-dicarboxy-5,6-dihydroxy-2-methyl-norbornane-7-acetate,
methyl α-methyl-2,3-dicarboxy-5,6-dihydroxy-2-methylnorbornane-acetate
ethyl α-ethyl-2,3-dicarboxy-5,6-dihydroxy-2-butyl-norbornane-7-acetate,
and the like.

EXAMPLE 11

Methyl 2,3-dicarboxy-5,6-dihydroxy-2-methylnorbornane-7-acetate acetonide

A 128 g. (0.424 mole) quantity of methyl 2,3-dicarboxy-5,6-dihydroxy - 2 - methylnorbornane-7-acetate was slurried in 2 l. acetone and 160 ml. of 2,2-dimethoxypropane. The slurry was treated with 4 ml. of 2.4 M hydrogen chloride in anhydrous dioxane, causing the suspended solid to dissolve immediately. After ½ hour, the solution was evaporated to dryness in vacuo leaving, when completely dry, 140 g. of crystals of methyl 2,3-dicarboxy-5,6-dihydroxy - 2 - methylnorbornane-7-acetate, acetonide suitable for further use. A sample was prepared for analysis by one recrystallization from benzene-acetone; melting point 154–155° C.

*Analysis.*—Calcd. for $C_{16}H_{22}O_8$ (percent): C, 56.15; H, 6.48. Found (percent): C, 56.25; H, 6.57.

EXAMPLE 12

Methyl α-methyl-2,3-dicarboxy-5,6-dihydroxy-2-methylnorbornane-7-acetate acetonide In the manner given in Example 11, methyl α-methyl-2,3-dicarboxy-5,6-dihydroxy-2-methyl - norbornane - 7 - acetate was treated with 2,2-dimethoxypropane in acetone to give methyl α-methyl - 2,3 - dicarboxy-5,6-dihydroxy-2-methylnorbornane-7-acetate acetonide.

In the manner given in Example 11, other alkyl 2,3-dicarboxy-5,6-dihydroxy - 2 - alkylnorbornane-7-acetic acid ketals or acetals can be prepared by reacting an alkyl 2,3-dicarboxy-5,6-dihydroxy-2-alkyl norbornane-7-acetate with a ketone or aldehyde. Representative compounds, thus obtained, include:

The acetonide, methyl ethyl ketal, diethyl ketal, propyl ethyl ketal, formaldehyde acetal, acetaldehyde acetal, and propionaldehyde acetal and the like of ethyl 2,3-dicarboxy-5,6-dihydroxy-2-methylnorbornane-7-acetate,
propyl 2,3-dicarboxy-5,6-dihydroxy-2-propylnorbornane-7-acetate,
butyl α-propyl-2,3-dicarboxy-5,6-dihydroxy-2-butyl-norbornane-7-acetate,
isopropyl α-butyl-2,3-dicarboxy-5,6-dihydroxy-2-isobutylnorbornane-7-acetate,
isobutyl 2,3-dicarboxy-5,6-dihydroxy-2-isopropyl-norbornane-7-acetate,
hexyl α-propyl-2,3-dicarboxy-5,6-dihydroxy-2-methyl-norbornane-7-acetate,
heptyl 2,3-dicarboxy-5,6-dihydroxy-2-ethylnorbornane-7-acetate,
octyl α-methyl-2,3-dicarboxy-5,6-dihydroxy-2-propyl-norbornane-7-acetate,
pentyl 2,3-dicarboxy-5,6-dihydroxy-2-ethylnorbornane-7-acetate,
isopentyl 2,3-dicarboxy-5,6-dihydroxy-2-methyl-norbornane-7-acetate,
methyl α-methyl-2,3-dicarboxy-5,6-dihydroxy-2-methylnorbornane-7-acetate,
ethyl α-ethyl-2,3-dicarboxy-5,6-dihydroxy-2-butyl-norbornane-7-acetate, and the like.

EXAMPLE 13

Methyl 2-methyl-5,6-dihydroxy-2-norbornene-7-acetate acetonide (VII when R, $R_1$, $R_4$, and $R_5$ are methyl; $R_2$ is hydrogen)

A 5.1 g. (15 millimoles) quantity of methyl 2,3-dicarboxy-5,6-dihydroxy - 2 - methylnorbornane-7-acetate acetonide was dissolved in 200 ml. of pyridine: water (90:10 by volume) and 3.75 ml. of triethylamine. The resultant solution was electrolyzed using platinum wire mesh electrodes held between 60 and 90 volts. The reaction temperature was maintained throughout at 15–20° C. using a solid carbon dioxide-acetone bath. The initial value for the amperage under these conditions was 4. The amperage was maintained at this value by the gradual addition of a solution of 20.5 g. of methyl 2,3-dicarboxy-5,6-dihydroxy-2-methylnorbornane - 7 - acetate acetonide in 100 ml. of pyridine:water (90:10 by volume) and 3.75 ml. of triethylamine. The addition was completed in about 1.5 hours, after which the reaction was allowed to proceed till the amperage fell below a value of one (about 5 hours total reaction time). The mixture was evaporated to dryness in vacuo and the residue was partitioned between 1 N hydrochloric acid and methylene chloride. The methylene chloride layer was washed successively with 1 N hydrochloric acid, 5% aqueous sodium bicarbonate and saturated brine, and dried over anhydrous sodium sulfate. Distillation of the methylene chloride left a dark brown residue which was combined with the crude residues from two similar runs. Chromatography on 2 kg. of silica gel, eluting with methanol:methylene chloride (3:97 by volume) gave two compounds. The faster moving was easily detectable on thin layer chromatography with $KMnO_4$—$NaIO_4$ reagent and was found by NMR to be the desired methyl 2-methyl-5,6-dihydroxy-2-norbornene-7-acetate acetonide.

The yields of this compound varied from 25% on the described scale above in greater than 50% on 1-gram runs.

IR spectrum (mineral oil mull): 1735, 1625, 1265, 1200, 1180, 1050, 1030, 855

EXAMPLE 14

Methyl α,2-dimethyl-5,6-dihydroxy-2-norbornene-7-acetate acetonide

In the manner given in Example 13, methyl α,2-dimethyl-2,3-dicarboxy - 5,6 - dihydroxynorbornane-7-acetate acetonide was decarboxylated in pyridine-water in the presence of triethylamine, with an electric current, to give methyl α,2-dimethyl-5,6-dihydroxy-2-norbornene-7-acetate acetonide.

In the manner given in Example 13, other alkyl 2,3-dicarboxy-5,6-dihydroxynorbornane - 7 - acetate ketals or acetals can be converted to the corresponding alkyl 2-alkyl - 5,6 - dihydroxy-2-norbornene-7-acetate ketals or acetals by means of electric current.

Representative compounds, thus obtained, include:

ethyl α,2-diethyl-5,6-dihydroxy-2-norbornene-7-acetate acetonide,
propyl α,2-dipropyl-5,6-dihydroxy-2-norbornene-7-acetate acetonide,
butyl α,2-dibutyl-5,6-dihydroxy-2-norbornene-7-acetate acetonide,
isopropyl α,2-dimethyl-5,6-dihydroxy-2-norbornene-7-acetate benzaldehyde acetal,
isobutyl α-methyl-2-ethyl-5,6-dihydroxy-2-norbornane-7-acetate diethyl ketone ketal,
pentyl α-ethyl-2-propyl-5,6-dihydroxy-2-norbornene-7-acetate methyl ethyl ketone ketal,
hexyl α-propyl-2-butyl-5,6-dihydroxy-2-norbornene-7-acetate formaldehyde acetal,
heptyl α-isopropyl-2-isobutyl-5,6-dihydroxy-2-norbornene-7-acetate acetonide,
octyl α-butyl-2-propyl-5,6-dihydroxy-2-norbornene-7-acetate methyl butyl ketone ketal,
isopentyl α-butyl-2-methyl-5,6-dihydroxy-2-norbornene-7-acetate propionaldehyde acetal,
methyl α-ethyl-2-methyl-5,6-dihydroxy-2-norbornene-7-acetate acetonide,
ethyl α-propyl-2-methyl-5,6-dihydroxy-2-norbornene-7-acetate acetonide,
propyl α-isopropyl-2-ethyl-5,6-dihydroxy-2-norbornene-7-acetate acetonide,
ethyl α,2-dibutyl-5,6-dihydroxy-2-norbornene-7-acetate acetonide, and the like.

EXAMPLE 15

Methyl 2-acetyl-3,4-dihydroxy-5-carboxycyclopentane-acetate acetonide (VIII, wherein R, $R_1$, $R_4$ and $R_5$ are methyl; $R_2$ is hydrogen)

A quantity of 9.6 g. (38 millimoles) of methyl 2-methyl-5,6-dihydroxy-2-norbornene-7-acetate acetonide was treated with 9.6 g. of solid sodium bicarbonate followed by 960 ml. of an aqueous solution containing 46.4 g. (218 millimoles) of sodium periodate and 0.9 g. (5.7 millimoles) of potassium permanganate. The reaction mixture was stirred vigorously for 4½ hours. The mixture was then cooled in an ice-bath and solid sodium sulfite slowly added until the potassium permanganate color disappeared. This solution was then extracted with methylene chloride. The aqueous layer was acidified to pH 2 and extracted 3 times with methylene chloride. The combined methylene chloride solutions were washed with saturated brine and dried over anhydrous sodium sulfate. Distillation of the methylene chloride in vacuo left 6.9 g. of oil which solidified on standing. Crystallization of this material from benzene-Skellysolve B hexanes gave 4.1 g. of crystalline methyl 2-acetyl-3,4-dihydroxy-5-carboxycyclopentaneacetate acetonide; melting point 87–93° C. A second and third crop were obtained and combined, giving another 1.0 g.; melting point 87–93° C. A sample was prepared for analysis by one further crystallization from benzene-Skellysolve B hexanes; melting point 91–93° C.

*Analysis.*—Calcd. for $C_{14}H_{20}O_7$ (percent): C, 55.99; H, 6.71. Found (percent): C, 55.71; H, 7.00.

EXAMPLE 16

Methyl α-methyl-2-acetyl-3,4-dihydroxy-5-carboxycyclopentaneacetate acetonide

In the manner given in Example 15, methyl α,2-dimethyl-5,6-dihydroxy-2-norbornene-7-acetate acetonide was converted with sodium bicarbonate, sodium periodate and potassium permanganate to methyl α-methyl-2-acetyl-3,4-dihydroxy-5-carboxycyclopentaneacetate acetonide.

In the same manner given in Example 15, other alkyl 2-alkyl-5,6-dihydroxy-2-norbornene-7-acetate acetals and ketals are converted to the corresponding alkyl 2-alkanoyl-3,4-dihydroxy-5-carbocyclopentaneacetate acetals and ketals.

Representative compounds, thus produced, include:

ethyl α-ethyl-2-propionyl-3,4-dihydroxy-5-carboxycyclopentaneacetate acetonide,
propyl α-propyl-2-butyryl-3,4-dihydroxy-5-carboxycyclopentaneacetate acetonide,
butyl α-butyl-2-valeryl-3,4-dihydroxy-5-carboxycyclopentaneacetate acetonide,
isopropyl α-methyl-2-acetyl-3,4-dihydroxy-5-carboxycyclopentaneacetate benzaldehyde acetal,
isobutyl α-ethyl-2-butyryl-3,4-dihydroxy-5-carboxycyclopentaneacetate diethyl ketone ketal,
pentyl α-propyl-2-valeryl-3,4-dihydroxy-5-carboxycyclopentaneacetate methyl ethyl ketone ketal,
hexyl α-isopropyl-2-isobutyryl-3,4-dihydroxy-5-carboxycyclopentaneacetate formaldehyde acetal,
heptyl α-butyl-2-butyryl-3,4-dihydroxy-5-carboxycyclopentaneacetate acetonide,
octyl α-butyl-2-acetyl-3,4-dihydroxy-5-carboxycyclopentaneacetate methyl butyl ketone ketal,
isopentyl α-ethyl-2-acetyl-3,4-dihydroxy-5-carboxycyclopentaneacetate acetonide,
ethyl α-isopropyl-2-propionyl-3,4-dihydroxy-5-carboxycyclopentaneacetate acetonide,
propyl α-ethyl-2-propionyl-3,4-dihydroxy-5-carboxycyclopentaneacetate acetonide,
ethyl α-butyl-2-valeryl-3,4-dihydroxy-5-carboxcyclopenpentaneacetate acetonide, and the like.

EXAMPLE 17

2-acetyl-3,4-dihydroxy-5-carboxycyclopentaneacetic acid 1,5-dimethyl ester, acetonide A 4.1 g. sample of methyl 2-acetyl-3,4-dihydroxy-5-carboxycyclopentaneacetate acetonide was dissolved in ether and treated with excess ethereal diazomethane. The solution was then evaporated to dryness, leaving 4.3 g. of colorless oil, suitable for the next reaction. A small sample was chromatographed on silica gel. The desired material was eluted with methanol:methylene chloride (2.5:97.5 by volume). Distillation of the solvent from the center fractions containing the product as indicated by thin layer chromatography left an oil, 2-acetyl-3,4-dihydroxy-5-carboxycyclopentaneacetic acid 1,5-dimethyl ester, acetonide.

*Analysis.*—Calcd. for $C_{15}H_{22}O_7$ (percent): C, 57.31; H, 7.06. Found (percent): C, 57.14; H, 7.04.

EXAMPLE 18

α-Methyl-2-acetyl-3,4-dihydroxy-5-carboxycyclopentaneacetic acid 1,5-dimethyl ester, acetonide In the manner given in Example 17, methyl α-methyl-2-acetyl - 3,4 - dihydroxy - 5 - carboxycyclopentaneacetate acetonide was treated with excess diazomethane in diethyl ether to give α-methyl-2-acetyl-3,4-dihydroxy-5-carboxycyclopentaneacetic acid 1,5-dimethyl ester, acetonide.

In like manner given in Example 17, other 2-alkanoyl-3,4-dihydroxy-5-carboxycyclopentaneacetic acid 1,5-dialkyl ester acetals or ketals can be produced by reacting a selected alkyl 2-alkanoyl-3,4-dihydroxy-5-carboxycyclopentaneacetate acetal or ketal with a diazoalkane. Representative compounds, thus obtained, include:

α-ethyl-2-propionyl-3,4-dihydroxy-5-carboxycyclopentaneacetic acid 1,5-diethyl ester, acetonide,
α-propyl-2-butyryl-3,4-dihydroxy-5-carboxycyclopentaneacetic acid 1-ethyl-5-propyl ester, acetonide,
α-butyl-2-valeryl-3,4-dihydroxy-5-carboxycyclopentaneacetic acid 1-methyl-5-ethyl ester, acetonide,
α-methyl-2-acetyl-3,4-dihydroxy-5-carboxycyclopentaneacetic acid 1-butyl-5-methyl ester, benzaldehyde acetal,
2-acetyl-3,4-dihydroxy-5-carboxycyclopentaneacetic acid 1-propyl-5-ethyl ester, diethyl ketone ketal,
α-methyl-2-valeryl-3,4-dihydroxy-5-carboxycyclopentaneacetic acid 1-heptyl-5-propyl ester, methyl ethyl ketone ketal,
α-ethyl-2-acetyl-3,4-dihydroxy-5-carboxycyclopentaneacetic acid 1-octyl-5-butyl ester, formaldehyde acetal,
α-propyl-2-valeryl-3,4-dihydroxy-5-carboxycyclopentaneacetic acid 1-isopropyl-5-methyl ester, acetonide
α-isopropyl-2-isobutyryl-3,4-dihydroxy-5-carboxycyclopentaneacetic acid 1-isobutyl-5-ethyl ester, methyl butyl ketone ketal,
α-butyl-2-butyryl-3,4-dihydroxy-5-carboxycyclopentaneacetic acid 1-pentyl-5-butyl ester, propionaldehyde acetal,
α-butyl-2-valeryl-3,4-dihydroxy-5-carboxycyclopentaneacetic acid 1-hexyl-5-propyl ester, acetonide,
α-propyl-2-acetyl-3,4-dihydroxy-5-carboxycyclopentaneacetic acid 1-octyl-5-propyl ester, acetonide,
α-isopropyl-2-isobutyryl-3,4-dihydroxy-5-carboxycyclopentaneacetic acid 1-pentyl-5-methyl ester, acetonide,
α-butyl-2-acetyl-3,4-dihydroxy-5-carboxycyclopentaneacetic acid 1-butyl-5-butyl ester, acetonide,
and the like.

EXAMPLE 19

2-(1-hydroxyethyl)-3,4-dihydroxy-5-carboxycyclopentaneacetic acid 1,5-dimethyl ester, acetonide A 3.7 g. (11.8 millimoles) quantity of 2-acetyl-3,4-dihydroxy-5-carboxycyclopentaneacetic acid 1,5-dimethyl ester, acetonide was dissolved in 20 ml. of methanol and the solution was cooled to 0° C. in an ice-salt bath. Over a period of 15 minutes, 334 mg. of sodium borohydride was added. After a total of 60 minutes, 0.53 ml. of acetic acid was added and the solution was evaporated to dryness. The residue was partitioned between methylene chloride and water. The methylene chloride layer was separated and combined with a methylene chloride wash of the water layer. The methylene chloride solution was washed with saturated brine and dried over anhyrous sodium sulfate. Distillation of the methylene chloride in vacuo left an essentially quantitative yield of oily residue, which was shown by NMR spectroscopy not to contain any detectable starting material but rather showed the product to consist of a nearly equal mixture of the diastereomeric alcohols, 2 - (1 - hydroxyethyl)-3,4-dihydroxy - 5 - carboxycyclopentaneacetic acid 1,5-dimethyl ester, acetonide.

EXAMPLE 20

α-Methyl-2-(1-hydroxyethyl)-3,4-dihydroxy-5-carboxycyclopentaneacetic acid 1,5-dimethyl ester, acetonide In the manner given in Example 19, α-methyl-2-acetyl-3,4-dihydroxy - 5 - carboxycyclopentaneacetic acid 1,5-dimethyl ester, acetonide was reduced with sodium borohydride to give a mixture of the two diastereoisomeric alcohols, α - methyl-2-(1-hydroxyethyl)-3,4-dihydroxy-5-carboxycyclopentaneacetic acid 1,5 - dimethyl ester, acetonide.

In the same manner given in Example 19, other 2-(1-hydroxyalkyl)-3,4-dihydroxy-1,5-dialkyl ester, acetals or ketals can be prepared by reducing the corresponding 2-alkanoyl - 3,4 - dihydroxy-5-carboxycyclopentaneacetic acid 1,5-dialkyl ester, acetals or ketals with an alkali metal borohydride. Representative compounds, thus prepared include:

α-ethyl-2-(1-hydroxypropyl)-3,4-dihydroxy-5-carboxycyclopentaneacetic acid 1,5-diethyl ester, acetonide,
α-propyl-2-(1-hydroxybutyl)-3,4-dihydroxy-5-carboxycyclopentaneacetic acid 1,5-diethyl ester, acetonide,
α-butyl-2-(1-hydroxypentyl)-3,4-dihydroxy-5-carboxycyclopentaneacetic acid 1-ethyl-5-propyl ester, acetonide,
α-methyl-2-(1-hydroxyethyl)-3,4-dihydroxy-5-carboxycyclopentaneacetic acid 1-methyl-5-ethyl ester, benzaldehyde acetal,
2-(1-hydroxyethyl)-3,4-dihydroxy-5-carboxycyclopentaneacetic acid 1-butyl-5-methyl ester, diethyl ketone ketal,
α-methyl-2-(1-hydroxypentyl)-3,4-dihydroxy-5-carboxycyclopentaneacetic acid 1-propyl-5-ethyl ester, methyl ethyl ketone ketal,
α-ethyl-2-(1-hydroxyethyl)-3,4-dihydroxy-5-carboxycyclopentaneacetic acid 1-heptyl-5-propyl ester, formaldehyde acetal,
α-propyl-2-(1-hydroxypentyl)-3,4-dihydroxy-5-carboxycyclopentaneacetic acid 1-octyl-5-butyl ester, acetonide,
α-isopropyl-2-(1-hydroxy-2-methylpropyl)-3,4-dihydroxy-5-carboxycyclopentaneacetic acid 1-isopropyl-5-methyl ester, methyl butyl ketone ketal,
α-butyl-2-(1-hydroxybutyl)-3,4-dihydroxy-5-carboxycyclopentaneacetic acid 1-(isobutyl)-5-ethyl ester, propionaldehyde acetal,
α-ethyl-2-(1-hydroxypentyl)-3,4-dihydroxy-5-carboxycyclopentaneacetic acid 1-pentyl-5-butyl ester, acetonide,
α-propyl-2-(1-hydroxyethyl)-3,4-dihydroxy-5-carboxycyclopentaneacetic acid 1-hexyl-5-propyl ester, acetonide,
α-isopropyl-2-(1-hydroxy-2-methylpropyl)-3,4-dihydroxy-5-carboxycyclopentaneacetic acid 1-octyl-5-propyl ester, acetonide,
α-butyl-2-(1-hydroxyethyl)-3,4-dihydroxy-5-carboxycyclopentaneacetic acid 1-pentyl-5-methyl ester, acetonide, and the like.

EXAMPLE 21

2-(1-hydroxyethyl)-3,4-dihydroxy-5-carboxycyclopentaneacetic acid 1,5 - dimethyl ester, 2 - methanesulfonate, acetonide; and 2-(1-hydroxyethyl) - 3,4 - dihydroxy-5-carboxycyclopentaneacetic acid 1,5-dimethyl ester, 2-acetate, acetonide A 0.70 g. (2.2 millimoles) quantity of 2-(1-hydroxyethyl) - 3,4 - dihydroxy-5-carboxycyclopentaneacetic acid 1,5-dimethyl ester, acetonide was dissolved in 10 ml. of pyridine and the solution was cooled to about 0° C. This solution was treated with 1.14 g. (10 millimoles) of methanesulfonyl chloride. After standing 18 hours at −2° C., the reaction mixture was treated with about 1 ml. of water and the mixture was allowed to stand for 10 minutes. The mixture was poured into methylene chloride and extracted with 1 N hydrochloric acid, 5% aqueous sodium bicarbonate, and saturated brine. The methylene chloride solution was dried over anhydrous sodium sulfate and distilled in vacuo, leaving 0.865 g. of oil. NMR showed this material to be a nearly equal mixture of the mesylates of the diastereomeric alcohols. On standing, the above oil crystallized. Recrystallization of the material from benzene-Skellysolve B hexanes gave 160 mg. of needles of melting point 99–103° C. A second crop was obtained from ether, amounting to 138 mg. of melting point 97–102° C. Recrystallization of combined crops 1 and 2 from benzene-Skellysolve B hexanes gave 180 mg. of needles of 2-(1-hydroxyethyl) - 3,4 - dihydroxy-5-carboxycyclopentaneacetic acid 1,5-dimethyl ester, 2-methanesulfonate, acetonide of melting point 102–103° C.

*Analysis.*—Calcd. for $C_{16}H_{26}O_9S$ (percent): C, 48.72; H, 6.65; S, 8.13. Found (percent): C, 48.82; H, 6.28; S, 7.94.

IR spectrum (mineral oil mull): 1735, 1695w, 1385, 1350, 1335, 1285, 1270, 1230, 1200, 1180, 1155, 1090, 1060, 985, 970, 900, 860, 810.

In a similar manner, but using acetic anhydride instead of methanesulfonyl chloride, there was prepared 2-(1-hydroxyethyl) - 3,4 - dihydroxy-5-carboxycyclopentaneacetic acid 1,5-dimethyl ester, 2-acetate, acetonide; melting point, 85–86.5° C.

*Analysis.*—Calcd. for $C_{17}H_{26}O_3$ (percent): C, 56.97; H, 7.31. Found (percent): C, 57.22; H, 7.45.

EXAMPLE 22

α-Methyl - 2 - (1 - hydroxyethyl) - 3,4 - dihydroxy-5-carboxycyclopentaneacetic acid 1,5-dimethyl ester, 2-methanesulfonate, acetonide In the manner given in Example 21, α-methyl-2-(1-hydroxyethyl) - 3,4 - dihydroxy-5-carboxycyclopentaneacetic acid 1,5-dimethyl ester, acetonide was treated with methanesulfonyl chloride in pyridine to give α-methyl-2-(1-hydroxyethyl) - 3,4 - dihydroxy - 5 - carboxycyclopentaneacetic acid 1,5 - dimethyl ester, 2 - methanesulfonate, acetonide.

In the manner given in Example 21, other 2-(1-hydroxyalkyl) - 3,4 - dihydroxy-5-carboxycyclopentaneacetic acid 1,5-dialkyl ester, 2-methanesulfonate, acetals or ketals can be prepared by treating the corresponding 2-(1-hydroxyalkyl) - 3,4 - dihydroxy-5-carboxycyclopentaneacetic acid ester 1,5-dialkyl ester, acetals or ketals with methanesulfonyl chloride. Representative compounds, thus produced, include:

α-ethyl-2-(1-hydroxypropyl)-3,4-dihydroxy-5-carboxycyclopentaneacetic acid 1,5-diethyl ester, 2-methanesulfonate, acetonide,
α-propyl-2-(1-hydroxybutyl)-3,4-dihydroxy-5-carboxycyclopentaneacetic acid 1-ethyl-5-propyl ester, 2-methanesulfonate, acetonide,
α-butyl-2-(1-hydroxypentyl)-3,4-dihydroxy-5-carboxycyclopentaneacetic acid 2-methyl-5-ethyl ester, 2-methanesulfonate, acetonide,
α-methyl-2-(1-hydroxyethyl)-3,4-dihydroxy-5-carboxycyclopentaneacetic acid 1-butyl-5-methyl ester, 2-methanesulfonate, benzaldehyde acetal,
2-(1-hydroxyethyl)-3,4-dihydroxy-5-carboxycyclopentaneacetic acid 1-propyl-5-ethyl ester, 2-methanesulfonate, diethyl ketone ketal,
α-methyl-2-(1-hydroxypentyl)-3,4-dihydroxy-5-carboxycyclopentaneacetic acid 1-heptyl-5-propyl ester, 2-methanesulfonate, methyl ethyl ketone ketal,
α-ethyl-2-(1-hydroxyethyl)-3,4-dihydroxy-5-carboxycyclopentaneacetic acid 1-octyl-5-butyl ester, 2-methanesulfonate, formaldehyde acetal,
α-propyl-2-(1-hydroxypentyl)-3,4-dihydroxy-5-carboxycyclopentaneacetic acid 1-isopropyl-5-methyl ester, 2-methanesulfonate, acetonide,
α-isopropyl-2-(1-hydroxy-2-methylpropyl)-3,4-dihydroxy-5-carboxycyclopentaneacetic acid 1-isobutyl-5-ethyl ester, 2-methanesulfonate, acetonide,
α-butyl-2-(1-hydroxybutyl)-3,4-dihydroxy-5-carboxycyclopentaneacetic acid 1-pentyl-5-butyl ester, 2-methanesulfonate, methyl butyl ketone ketal,
α-ethyl-2-(1-hydroxypentyl)-3,4-dihydroxy-5-carboxycyclopentaneacetic acid 1-hexyl-5-propyl ester, 2-methanesulfonate, propionaldehyde acetal,
α-propyl-2-(1-hydroxyethyl)-3,4-dihydroxy-5-carboxycyclopentaneacetic acid 1-octyl-5-propyl ester, 2-methanesulfonate, acetonide,
α-isopropyl-2-(1-hydroxy-2-methylpropyl)-3,4-dihydroxy-5-carboxycyclopentaneacetic acid 1-pentyl-5-methyl ester, 2-methanesulfonate, acetonide,
α-butyl-2-(1-hydroxyethyl)-3,4-dihydroxy-5-carboxycyclopentaneacetic acid 1,5-dibutyl ester, 2-methanesulfonate, acetonide, and the like.

EXAMPLE 23

2-(1-hydroxyethyl) - 3,4 - dihydroxy-5-carboxycyclopentaneacetic acid 1,5-dimethyl ester, 2-methanesulfonate A 340 mg. sample of 2-(1-hydroxyethyl)-3,4-dihydroxy - 5 - carboxycyclopentaneacetic acid 1,5-dimethyl ester, 2-methanesulfonate, acetonide was dissolved in 5 ml. of 60% formic acid-40% water (by volume) and allowed to stand at 25° C. for 2½ hours. The reaction mixture was then evaporated to dryness at 25° C. in vacuo. The residue was dissolved in water and the solution was freeze-dried, leaving 271 mg. of oily 2-(1-hydroxyethyl) - 3,4-dihydroxy-5-carboxycyclopentaneacetic acid 1,5-dimethyl ester, 2-methanesulfonate which was suitable for the next step.

EXAMPLE 24

α - Methyl - 2-(1-hydroxyethyl)-3,4-dihydroxy-5-carboxycyclopentaneacetic acid 1,5-dimethyl ester, 2-methanesulfonate In the manner given in Example 23, α-methyl-2-(1-hydroxyethyl) - 3,4 - dihydroxy-5-carboxycyclopentaneacetic acid 1,5-dimethyl ester, 2-methanesulfonate, acetonide was hydrolyzed with a mixture of formic acid and water to give α-methyl-2-(1-hydroxyethyl)-3,4-dihydroxy-5-carboxycyclopentaneacetic acid 1,5-dimethyl ester, 2-methanesulfonate.

In the same manner given in Example 23, other 2-(1 - hydroxyalkyl)-3,4-dihydroxy-5-carboxycyclopentaneacetic acid 1,5-alkyl ester, 2-methanesulfonates can be prepared from the corresponding acetals or ketals by hydrolysis with formic acid and water. Representative compounds, thus obtained, include:

α-ethyl-2-(1-hydroxypropyl)-3,4-dihydroxy-5-carboxycyclopentaneacetic acid 1,5-diethyl ester, 2-methanesulfonate,
α-propyl-2-(1-hydroxybutyl)-3,4-dihydroxy-5-carboxycyclopentaneacetic acid 1-ethyl-5-propyl ester, 2-methanesulfonate,
α-butyl-2-(1-hydroxypentyl)-3,4-dihydroxy-5-carboxycyclophentaneacetic acid 1-methyl-5-ethyl ester, 2-methanesulfonate,
α-methyl-2-(1-hydroxyethyl)-3,4-dihydroxy-5-carboxycyclopentaneacetic acid 1-butyl-5-methyl ester, 2-methanesulfonate,
2-(1-hydroxyethyl)-3,4-dihydroxy-5-carboxycyclopentaneacetic acid 1-propyl-5-ethyl ester, 2-methanesulfonate,
α-methyl-2-(1-hydroxypentyl)-3,4-dihydroxy-5-carboxycyclopentaneacetic acid 1-heptyl-5-propyl ester, 2-methanesulfonate,
α-ethyl-2-(1-hydroxyethyl)-3,4-dihydroxy-5-carboxycyclopentaneacetic acid 1-octyl-5-butyl ester, 2-methanesulfonate,
α-propyl-2-(1-hydroxypentyl)-3,4-dihydroxy-5-carboxycyclopentaneacetic acid 1-isopropyl-5-methyl ester, 2-methanesulfonate,
α-isopropyl-2-(1-hydroxy-2-methylpropyl)-3,4-dihydroxy-5-carboxycyclopentaneacetic acid 1-isopbutyl-5-ethyl ester, 2-methanesulfonate,
α-butyl-2-(1-hydroxybutyl)-3,4-dihydroxy-5-carboxycyclopentaneacetic acid 1-pentyl-5-butyl ester, 2-methanesulfonate,
α-ethyl-2-(1-hydroxypentyl)-3,4-dihydroxy-5-carboxycyclopentaneacetic acid 1-hexyl-5-propyl ester, 2-methanesulfonate,
α-propyl-2-(1-hydroxyethyl)-3,4-dihydroxy-5-carboxycyclopentaneacetic acid 1-octyl-5-propyl ester, 2-methanesulfonate, α-isopropyl-2-(1-hydroxy-2-methylpropyl)-3,4-dihydroxy-5-carboxycyclopentaneacetic acid 1-pentyl-5-methyl ester, 2-methanesulfonate, α-butyl-2-(1-hydroxyethyl)-3,4-dihydroxy-5-carboxy-cyclopentaneacetic acid 1,5-dibutyl ester, 2-methanesulfonate, and the like.

EXAMPLE 25

2-hydroxy-3-(1-hydroxyethyl)-5-carboxy-3,4-dihydro-2H-pyran-4-acetic acid 4,5-dimethyl ester, 3-methanesulfonate

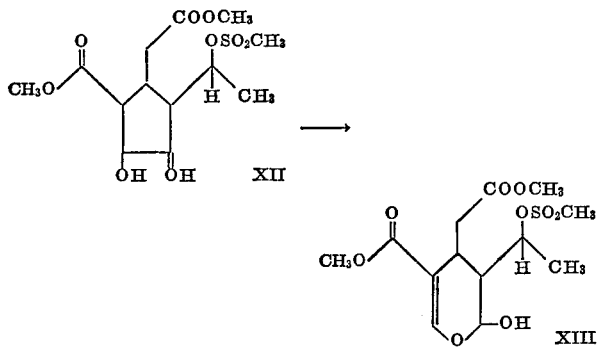

A 177 mg. (0.5 millimole) sample of 2-(1-hydroxyethyl)-3,4-dihydroxy-5-carboxycyclopentaneacetic acid 1,5-dimethyl ester, 2-methanesulfonate was treated with 50 ml. of water containing 214 mg. (1.0 millimole) of sodium periodate. The pH of the reaction mixture was adjusted to 6. After stirring 45 minutes, the reaction mixture was extracted 3 times with methylene chloride. The combined methylene chloride solutions were dried over anhydrous sodium sulfate. Distillation of the methylene chloride in vacuo left 160 mg. of oil. Chromatography on 30 g. of silica gel, eluting with acetone-benzene (15–85 by volume) gave three compounds. The third compound eluted, consisting of 79 mg., was found to be the desired 2 - hydroxy - 3 - (1-hydroxyethyl)-5-carboxy-3,4-dihydro-2H-pyran-4-acetic acid 4,5-dimethyl ester, 3-methanesulfonate by NMR, IR and UV spectroscopy. The material crystallized on standing.

The material was prepared for analysis by recrystallization from benzene, giving 32 mg. of colorless crystals of melting point 107–111° C.

Analysis.—Calcd. for $C_{13}H_{20}O_9S$ (percent): C, 44.31; H, 5.72; S, 9.10. Found (percent): C, 44.23; H, 6.23; S, 9.21.

UV max (95% $C_2H_5OH$): 234mμ (ε 12,200).

NMR spectrum ($CDCl_3\delta$): 1.57 (3H, d., J=6 cps.), 2.1–3.1 (m.), 3.00 (s.), 3.68 (3H, s.), 3.73 (3H, s.), 4.2–4.8 (2H, m.), 5.6–5.8 (1H, m.), 7.54 (1H, s.).

EXAMPLE 26

α - Methyl - 2-hydroxy-3-(1-hydroxyethyl)-5-carboxy 3,4-dihydro-2H-pyran-4-acetic acid 4,5-dimethyl ester, 3-methanesulfonate In the manner given in Example 25, α-methyl-2-(1-hydroxyethyl) - 3,4-dihydroxy-5-carboxycyclopentaneacetic acid 1,5-dimethyl ester, 2-methanesulfonate was oxidized with aqueous sodium periodate to give α-methyl-2-hydroxy - 3-(1-hydroxyethyl)-5-carboxy-3,4-dihydro-2H-pyran-4-acetic acid 4,5-dimethyl ester, 3-methanesulfonate.

In the same manner given in Example 25, other 2-hydroxy - 3 - (1-hydroxyalkyl)-5-carboxy-3,4-dihydro-2H-pyran-4-acetic acid 4,5-dialkyl ester, 3-methanesulfonates can be prepared from the corresponding glycols (XII) by oxidation with an aqueous periodate salt. Representative compounds thus obtained include:

α-ethyl-2-hydroxy-3-(1-hydroxypropyl)-5-carboxy-3,4-dihydro-2H-pyran-4-acetic acid 4,5-diethyl ester, 3-methanesulfonate, 2-hydroxy-3-(1-hydroxybutyl)-5-carboxy-3,4-dihydro-2H-pyran-4-acetic acid 4-ethyl-5-propyl ester, 3-methanesulfonate, α-butyl-2-hydroxy-3-(1-hydroxypentyl)-5-carboxy-3,4-dihydro-2H-pyran-4-acetic acid 4-methyl-5-ethyl ester, 3-methanesulfonate, 2-hydroxy-3-(1-hydroxyethyl)-5-carboxy-3,4-dihydro-2H-pyran-4-acetic acid 4-butyl-5-methyl ester, 3-methanesulfonate, 2-hydroxy-3-(1-hydroxyethyl)-5-carboxy-3,4-dihydro-2H-pyran-4-acetic acid 4-propyl-5-ethyl ester, 3-methanesulfonate, 2-hydroxy-3-(1-hydroxypentyl)-5-carboxy-3,4-dihydro-2-H-pyran-4-acetic acid 4-heptyl-5-propyl ester, 3-methanesulfonate, α-ethyl-2-hydroxy-3-(1-hydroxyethyl)-5-carboxy-3,4-dihydro-2H-pyran-4-acetic acid 4-octyl-5-butyl ester, 3-methanesulfonate, 2-hydroxy-3-(1-hydroxypentyl)-5-carboxy-3,4-dihydro-2H-pyran-4-acetic acid 4-isopropyl-5-methyl ester, 3-methanesulfonate, α-isopropyl-2-hydroxy-3-(1-hydroxy-2-methylpropyl)-5-carboxy-3,4-dihydro-2H-pyran-4-acetic acid 4-isobutyl-5-ethyl ester, 3-methanesulfonate, 2-hydroxy-3-(1-hydroxybutyl)-5-carboxy-3,4-dihydro-2H-pyran-4-acetic acid 4-pentyl-5-butyl ester, 3-methanesulfonate, 2-hydroxy-3-(1-hydroxypentyl)-5-carboxy-3,4-dihydro-2H-pyran-4-acetic acid 4-hexyl-5-propyl ester, 3-methanesulfonate, α-propyl-2-hydroxy-3-(1-hydroxyethyl)-5-carboxy-3,4-dihydro-2H-pyran-4-acetic acid 4-octyl-5-propyl ester, 3-methanesulfonate, α-isopropyl-2-hydroxy-3-(1-hydroxy-2-methylpropyl)-5-carboxy-3,4-dihydro-2H-pyran-4-acetic acid 4-pentyl-5-methyl ester, 3-methanesulfonate, 2-hydroxy-3-(1-hydroxyethyl)-5-carboxy-3,4-dihydro-2H-pyran-4-acetic acid 4,5-dibutyl ester, 3-methanesulfonate, and the like.

EXAMPLE 27

2-methyl-3-formyl-5-carboxy-3,4-dihydro-2H-pyran-4-acetic acid, 4,5-dimethyl ester (methyl elenolate) XIV

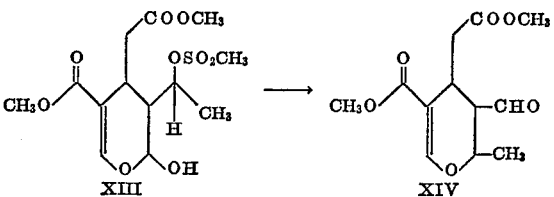

A 0.67 g. sample of 2-hydroxy-3-(1-hydroxyethyl)-5-carboxy - 3,4 - dihydro - 2H - pyran-4-acetic acid 4,5-dimethyl ester, 3-methanesulfonate was dissolved in 5 ml. of pyridine and 3 ml. of water and the solution heated on a steam bath for 15 minutes. The reaction mixture was poured into methylene chloride and the methylene chloride layer extracted successively with 1 N hydrochloric acid, 5% aqueous sodium bicarbonate and water. The methylene chloride solution was dried over anhydrous sodium sulfate and distilled in vacuo, leaving 356 mg. of oil which crystallized on standing. Recrystallization from benzene-Skellysolve B hexanes gave 73 mg. of colorless prisms of methyl elenolate; melting point 93–98° C. This racemic material differs from the purified natural material only in being crystalline; all other physical properties such as IR, UV, and NMR spectrum are identical.

In the same manner given in Example 27, other elenolic acid alkyl esters and analogues of Formula XIV can be prepared by heating a 2-hydroxy-3-(1-hydroxyalkyl)-5-carboxy-3,4-dihydro-2H-pyran-4-acetic acid 4,5-dialkyl ester, 3-methanesulfonate (XIII). Representative compounds, thus obtained, include:

α,2-dimethyl-3-formyl-5-carboxy-3,4-dihydro-2H-pyran-4-acetic acid 4,5-dimethyl ester,
2-butyl-3-formyl-5-carboxy-3,4-dihydro-2H-pyran-4-acetic acid 4,5-diethyl ester,
α-propyl-2-methyl-3-formyl-5-carboxy-3,4-dihydro-2H-pyran-4-acetic acid 4-ethyl-5-propyl ester,
2-ethyl-3-formyl-5-carboxy-3,4-dihydro-2H-pyran-4-acetic acid 4-methyl-5-ethyl ester,
α,2-dimethyl-3-formyl-5-carboxy-3,4-dihydro-2H-pyran-4-acetic acid 4-butyl-5-methyl ester,
2-methyl-3-formyl-5-carboxy-3,4-dihydro-2H-pyran-4-acetic acid 4-propyl-5-ethyl ester,
2-isopropyl-3-formyl-5-carboxy-3,4-dihydro-2H-pyran-4-acetic acid 4-heptyl-5-propyl ester,
2-ethyl-3-formyl-5-carboxy-3,4-dihydro-2H-pyran-4-acetic acid 4-octyl-5-butyl ester,
2-methyl-3-formyl-5-carboxy-3,4-dihydro-2H-pyran-4-acetic acid 4-isopropyl-5-methyl ester,
α-isopropyl-2-methyl-3-formyl-5-carboxy-3,4-dihydro-2H-pyran-4-acetic acid 4-isobutyl-5-ethyl ester,
α-butyl-2-methyl-3-formyl-5-carboxy-3,4-dihydro-2H-pyran-4-acetic acid 4-pentyl-5-butyl ester,
α-ethyl-2-methyl-3-formyl-5-carboxy-3,4-dihydro-2H-pyran-4-acetic acid 4-hexyl-5-propyl ester,
2-propyl-3-formyl-5-carboxy-3,4-dihydro-2H-pyran-4-acetic acid 4-octyl-5-propyl ester,
α-isopropyl-2-methyl-3-formyl-5-carboxy-3,4-dihydro-2H-pyran-4-acetic acid 4-pentyl-5-methyl ester,
2-methyl-3-formyl-5-carboxy-3,4-dihydro-2H-pyran-4-acetic acid 4,5-dibutyl ester, and the like.

EXAMPLE 28

Elenolic acid and its calcium salt

A 5.0 g. quantity of methyl elenolate was suspended in 50 ml. of 0.1 M sulfuric acid and the mixture was heated on a steam bath for 7½ hours. After cooling, saturated aqueous barium hydroxide was added until precipitation of barium sulfate ceased. The mixture was then filtered through a filter aid and the filtrate was freeze-dried. The residue was purified by partition chromatography, using diatomaceous earth as a support and a system consisting of toluene-Skellysolve B hexanes-acetic acid-water (6:4:5:5 by volume). The first peak eluted contained 1.58 g. of material and was found to be methyl elenolate by NMR spectroscopy. The second peak was found to contain mainly elenolic acid by NMR spectroscopy.

The residue from the evaporation of the second peak fractions was dissolved in water and the solution was stirred with excess calcium carbonate for 4 hours. The mixture was then filtered and the filtrate was freeze-dried, leaving 1.94 g. of product. The NMR showed the material to be reasonably pure calcium elenolate.

In the manner given in Example 28, elenolic acid analogs of Formula XV are obtained by selectively hydrolysing 2-alkyl-3-formyl-5-carboxy-3,4-dihydro-2H-pyran-4-acetic acid 4,5-dialkyl esters with a dilute mineral acid such as 0.1 M aqueous sulfuric acid.

Representative compounds, thus obtained, include:

α,2-dimethyl-3-formyl-5-carboxy-3,4-dihydro-2H-pyran-4-acetic acid 5-methyl ester,
2-butyl-3-formyl-5-carboxy-3,4-dihydro-2H-pyran-4-acetic acid 5-ethyl ester,
α-propyl-2-methyl-3-formyl-5-carboxy-3,4-dihydro-2H-pyran-4-acetic acid 5-ethyl ester,
2-ethyl-3-formyl-5-carboxy-3,4-dihydro-2H-pyran-4-acetic acid 5-methyl ester,
α,2-dimethyl-3-formyl-5-carboxy-3,4-dihydro-2H-pyran-4-acetic acid 5-butyl ester,
2-methyl-3-formyl-5-carboxy-3,4-dihydro-2H-pyran-4-acetic acid 5-propyl ester,
2-isopropyl-3-formyl-5-carboxy-3,4-dihydro-2H-pyran-4-acetic acid 5-heptyl ester,
2-ethyl-3-formyl-5-carboxy-3,4-dihydro-2H-pyran-4-acetic acid 5-octyl ester,
2-propyl-3-formyl-5-carboxy-3,4-dihydro-2H-pyran-4-acetic acid 5-isopropyl ester,
α-isopropyl-2-methyl-3-formyl-5-carboxy-3,4-dihydro-2H-pyran-4-acetic acid 5-isobutyl ester,
α-butyl-2-methyl-3-formyl-5-carboxy-3,4-dihydro-2H-pyran-4-acetic acid 5-pentyl ester,
α-ethyl-2-methyl-3-formyl-5-carboxy-3,4-dihydro-2H-pyran-4-acetic acid 5-hexyl ester,
2-propyl-3-formyl-5-carboxy-3,4-dihydro-2H-pyran-4-acetic acid 5-octyl ester,
2-isopropyl-3-formyl-5-carboxy-3,4,-dihydro-2H-pyran-4-acetic acid 5-pentyl ester,
α-butyl-2-methyl-3-formyl-5-carboxy-3,4-dihydro-2H-pyran-4-acetic acid 5-butyl ester,
and the like.

In a similar manner described for elenolic, demethylelenoic acid can be prepared which has likewise antiviral activity. For this purpose maleic anhydride is substituted for the citraconic anhydride in Example 3. Carrying the product of Example 3 through to Example 15, a product VIIIa is obtained wherein $R_1$ is OH instead of methyl. Compound VIIIa is converted to an anhydride, which upon alcoholyis gives a product IXa in which $R_1$ is OH. Reduction of IXa results in a primary alcohol Xa (like X wherein $R_1$ is H). Continuing the reaction with Xa in like manner for X, a Compound XVa is obtained in which $R_1$ is hydrogen.

What is claimed is:
1. 2-hydroxy-3-(1-hydroxyethyl)-5-carboxy-3,4-dihydro-2H-pyran-4-acetic acid 4,5-dimethyl ester, 3-methanesulfonate.

No references cited.

NORMA S. MILESTONE, Primary Examiner

UNITED STATES PATENT OFFICE
CERTIFICATE OF CORRECTION

PATENT NO. : 3,770,777
DATED : November 6, 1973
INVENTOR(S) : Robert C. Kelly

It is certified that error appears in the above-identified patent and that said Letters Patent are hereby corrected as shown below:

Column 1, line 20-25, Formula XIV should appear as shown below instead of as in the patent:

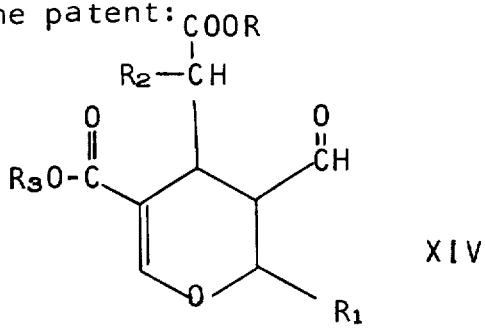

Column 1, line 46, "(1)" should read -- 1 --; line 51, "(2)" should read -- 2 --. Column 2, line 10-15, formula should appear as shown below instead of as in the patent:

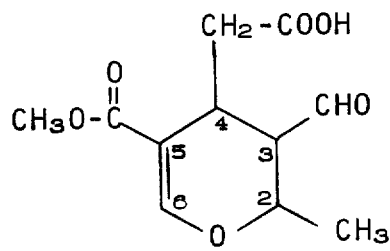

Column 3, line 35-42, Formula XIV should appear as shown below instead of as in the patent:

UNITED STATES PATENT OFFICE
CERTIFICATE OF CORRECTION

PATENT NO. : 3,770,777
DATED : November 6, 1973
INVENTOR(S) : Robert C. Kelly

It is certified that error appears in the above-identified patent and that said Letters Patent are hereby corrected as shown below:

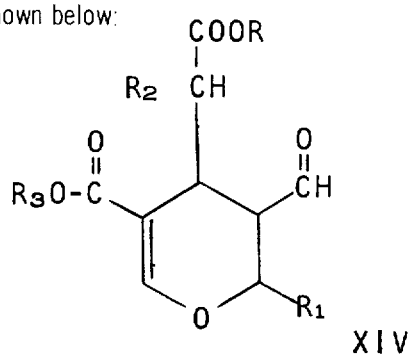

XIV

Column 4, line 36, "of Formula XV" should read -- of Formula (XV) --. Column 5, line 21, "<10" should read -- <$10^1$ --; line 65, "tested" should read -- treated --. Column 6, line 58/59, "didroxy" should read -- dihydroxy --. Column 7, line 16, "alkyl-3,4" should read -- alkyl)-3,4 --; line 43, "34-" should read -- 3,4- --. Column 9, line 48, "acetaate" should read -- acetate --. Column 10, line 56, "methylnorbornene" should read -- methylnorborane --. Column 12, line 74, "described scale above to" should read -- scale described above in --. Column 14, line 17, "carbocyclo" should read -- carboxycyclo --; line 45/46, "carboxycyclopenpentane" should read --carboxycyclopentane --. Column 15, line 53, "anhyrous" should read -- anhydrous --. Column 16, line 31, "-(isobutyl)-" should read -- -isobutyl- --. Column 17, line 13, "$O_3$" should read -- $O_8$ --. Column 18, line 47, "cyclophentane" should read -- cyclopentane --; line 65, "isopbutyl" should read -- isobutyl -- Column 19, line 13-20, Formula XII should appear as shown below instead of as in the patent:

UNITED STATES PATENT OFFICE
CERTIFICATE OF CORRECTION

PATENT NO. : 3,770,777
DATED : November 6, 1973
INVENTOR(S) : Robert C. Kelly

It is certified that error appears in the above-identified patent and that said Letters Patent are hereby corrected as shown below:

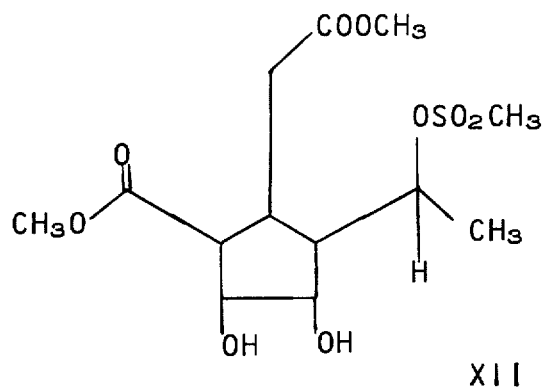

Column 20, line 14, "2-H" should read -- -2H- --.

Signed and Sealed this twenty-third Day of September 1975

[SEAL]

Attest:

RUTH C. MASON
Attesting Officer

C. MARSHALL DANN
Commissioner of Patents and Trademarks